US011495041B2

(12) United States Patent
Derakhshani

(10) Patent No.: US 11,495,041 B2
(45) Date of Patent: Nov. 8, 2022

(54) BIOMETRIC IDENTIFICATION USING COMPOSITE HAND IMAGES

(71) Applicant: Jumio Corporation, Palo Alto, CA (US)

(72) Inventor: Reza R. Derakhshani, Shawnee, KS (US)

(73) Assignee: Jumio Corporation, Palo Alto, CA (US)

( * ) Notice: Subject to any disclaimer, the term of this patent is extended or adjusted under 35 U.S.C. 154(b) by 21 days.

(21) Appl. No.: 16/370,575

(22) Filed: Mar. 29, 2019

(65) Prior Publication Data

US 2020/0311404 A1    Oct. 1, 2020

(51) Int. Cl.
| | | |
|---|---|---|
| G06V 40/14 | (2022.01) | |
| G06V 40/10 | (2022.01) | |
| G06N 20/00 | (2019.01) | |
| G06F 21/32 | (2013.01) | |
| G06N 3/08 | (2006.01) | |
| G06V 40/70 | (2022.01) | |

(52) U.S. Cl.
CPC ............. *G06V 40/11* (2022.01); *G06F 21/32* (2013.01); *G06N 3/08* (2013.01); *G06N 20/00* (2019.01); *G06V 40/70* (2022.01); *G06V 40/117* (2022.01); *G06V 40/14* (2022.01)

(58) Field of Classification Search
CPC .................................................. G06K 9/00288
See application file for complete search history.

(56) References Cited

U.S. PATENT DOCUMENTS

| | | | | |
|---|---|---|---|---|
| 10,452,959 | B1* | 10/2019 | Gautam | ............... G06N 3/0454 |
| 10,474,191 | B2* | 11/2019 | Park | ....................... G06V 40/28 |
| 2008/0298642 | A1* | 12/2008 | Meenen | ................... G06K 9/00 382/115 |
| 2011/0304720 | A1* | 12/2011 | Kumar | ............... G06K 9/00892 348/77 |

(Continued)

FOREIGN PATENT DOCUMENTS

| | | |
|---|---|---|
| EP | 3287943 | 2/2018 |
| WO | WO 2016023582 | 2/2016 |

OTHER PUBLICATIONS

PCT International Search Report and Written Opinion in International Application No. PCT/US2020/016748, dated Jun. 25, 2020, 13 pages.

*Primary Examiner* — Cindy Trandai
(74) *Attorney, Agent, or Firm* — Patent Law Works LLP

(57) ABSTRACT

The technology described in this document can be embodied in a method that includes obtaining, by one or more image acquisition devices, a first image of a portion of a human body under illumination by electromagnetic radiation in a first wavelength range, and obtaining a second image of the portion of the human body under illumination by electromagnetic radiation in a second wavelength range. The method also includes generating, by one or more processing devices, a third image or template that combines information from the first image with information from the second image. The method also includes determining that one or more metrics representing a similarity between the third image and a template satisfy a threshold condition, and responsive to determining that the one or more metrics satisfy a threshold condition, providing access to the secure system.

22 Claims, 5 Drawing Sheets

(56) References Cited

U.S. PATENT DOCUMENTS

| | | | |
|---|---|---|---|
| 2014/0086459 A1* | 3/2014 | Pan | G06K 9/00892 382/124 |
| 2014/0241596 A1* | 8/2014 | Chen | G06K 9/00885 382/124 |
| 2015/0131899 A1* | 5/2015 | Lu | G06K 9/626 382/159 |
| 2016/0048718 A1* | 2/2016 | Apostolos | G06K 9/00087 382/124 |
| 2016/0162673 A1* | 6/2016 | Kutliroff | G06F 21/32 382/115 |
| 2016/0225053 A1* | 8/2016 | Romley | G06Q 30/0623 |
| 2016/0328600 A1* | 11/2016 | Che | G06K 9/2018 |
| 2017/0206397 A1* | 7/2017 | Picard | G06K 9/0012 |
| 2018/0209908 A1* | 7/2018 | Che | G01N 33/582 |
| 2018/0330179 A1* | 11/2018 | Streit | G06N 3/0445 |
| 2019/0026453 A1* | 1/2019 | Choi | G06K 9/00885 |
| 2019/0251684 A1* | 8/2019 | Ko | G06T 3/0093 |
| 2019/0278970 A1* | 9/2019 | Naruse | G06K 9/0004 |
| 2020/0005061 A1* | 1/2020 | Lu | G06T 7/194 |
| 2020/0175260 A1* | 6/2020 | Cheng | G06K 9/66 |
| 2020/0242402 A1* | 7/2020 | Jung | G06V 20/30 |
| 2020/0293750 A1* | 9/2020 | Zuta | G06V 10/141 |
| 2020/0296301 A1* | 9/2020 | Johnson | H04N 5/272 |
| 2020/0302249 A1* | 9/2020 | Liu | G06T 7/97 |
| 2021/0279868 A1* | 9/2021 | Ma | G06N 3/08 |

* cited by examiner

BIOMETRIC IDENTIFICATION USING COMPOSITE HAND IMAGES

TECHNICAL FIELD

This disclosure relates to image capture devices.

BACKGROUND

Systems incorporating a biometric identification technology such as face recognition or hand recognition often include a camera that captures an image of a user. The captured image is then processed to authenticate the user using the biometric identification technology.

SUMMARY

In one aspect, this document features a method of controlling access to a secure system. The method includes obtaining, by one or more image acquisition devices, a first image of a portion of a human body under illumination by electromagnetic radiation in a first wavelength range. The first image includes information on skin texture of the portion of the human body. The method also includes obtaining, by the one or more image acquisition devices, a second image of the portion of the human body under illumination by electromagnetic radiation in a second wavelength range. The second image includes information on subcutaneous vasculature in the portion of the human body. The method also includes generating, by one or more processing devices, a composite template that combines information from the first image with information from the second image. The method also includes determining that one or more metrics representing a similarity between the composite template and an enrollment template satisfy a threshold condition, and responsive to determining that the one or more metrics representing the similarity between the composite template and the enrollment template satisfy a threshold condition, providing access to the secure system.

Implementations of the above aspects can include one or more of the following features. Generating the composite template can include using a classifier configured to fuse the information from the first image and the information from the second image at one of an early fusion level, an intermediate fusion level, or a late fusion level. Generating the composite template can include first generating a first template from the first image and generating a second template from the second image. Generating the template for the first and second images can include extracting, from the first and second images, a respective portion representative of a hand. Extracting a portion representative of the hand can include excluding at least partially accessories worn on the hand. The skin texture can include micro features. The skin texture can include at least one of: freckles, spots, moles, lines, and wrinkles. The portion of the human body can include a hand. Obtaining a first and second image of the hand can include capturing double-sided images of the hand. The first wavelength range can include between 380 and 600 nanometers. The second wavelength range can include between 700 and 1000 nanometers. The one or more metrics can include one or more of a cosine similarity metric, Euclidean distance metric, Mahalanobis distance metric, or a learned data-driven similarity metric.

In another aspect, this document features a system that includes at least one processing device associated with a secure system and a memory communicatively coupled to the at least one processing device. The memory can store instructions which, when executed, cause the at least one processing device to perform operations that include obtaining, from one or more image acquisition devices, a first image of a portion of a human body under illumination by electromagnetic radiation in a first wavelength range. The first image can include information on skin texture of the portion of the human body. The operations can also include obtaining, from the one or more image acquisition devices, a second image of the portion of the human body under illumination by electromagnetic radiation in a second wavelength range. The second image can include information on subcutaneous or deeper vasculature in the portion of the human body. The operations can also include generating, by the at least one processing device, a composite template that combines information from the first image with information from the second image. The operations can also include determining that one or more metrics representing a similarity between the composite template and an enrollment template satisfy a threshold condition, and responsive to determining that the one or more metrics representing the similarity between the composite template and the enrollment template satisfy a threshold condition, providing access to the secure system.

Implementations of the above aspects can include one or more of the following features. The system can further including an image acquisition device, a first illumination source configured to radiate light in the first wavelength range, and a second illumination source configured to radiate light in the second wavelength range. The image acquisition device can have a field of view facing the second illumination source such that the portion of the human body is between the image acquisition device and the second illumination source. Generating the composite template can include using a classifier configured to fuse the information from the first image and the information from the second image at one of an early fusion level, an intermediate fusion level, or a late fusion level. Generating the composite template can include first generating a first template from the first image and generating a second template from the second image. Generating the template for the first and second images can include extracting, from the first and second images, a respective portion representative of a hand. The one or more metrics can include one or more of a cosine similarity metric, a Euclidean distance metric, a Mahalanobis distance metric, or a learned data-driven similarity metric. The skin texture can include micro features. The portion of the human body can include a hand.

Various implementations described herein may provide one or more of the following advantages. The reliability and security of a biometric authentication system can be improved by using a multimodal biometric authentication system. Given the proprietary nature of multispectral and multi-scale hand/finger scans, concerns about cross matching issues with existing traditional biometric templates can be mitigated, accuracy can be increased, and spoof detection can be improved. Additionally, by creating a unique hand template featuring information from two different modalities, the efficiency of large gallery identification can be improved.

Figure 1:
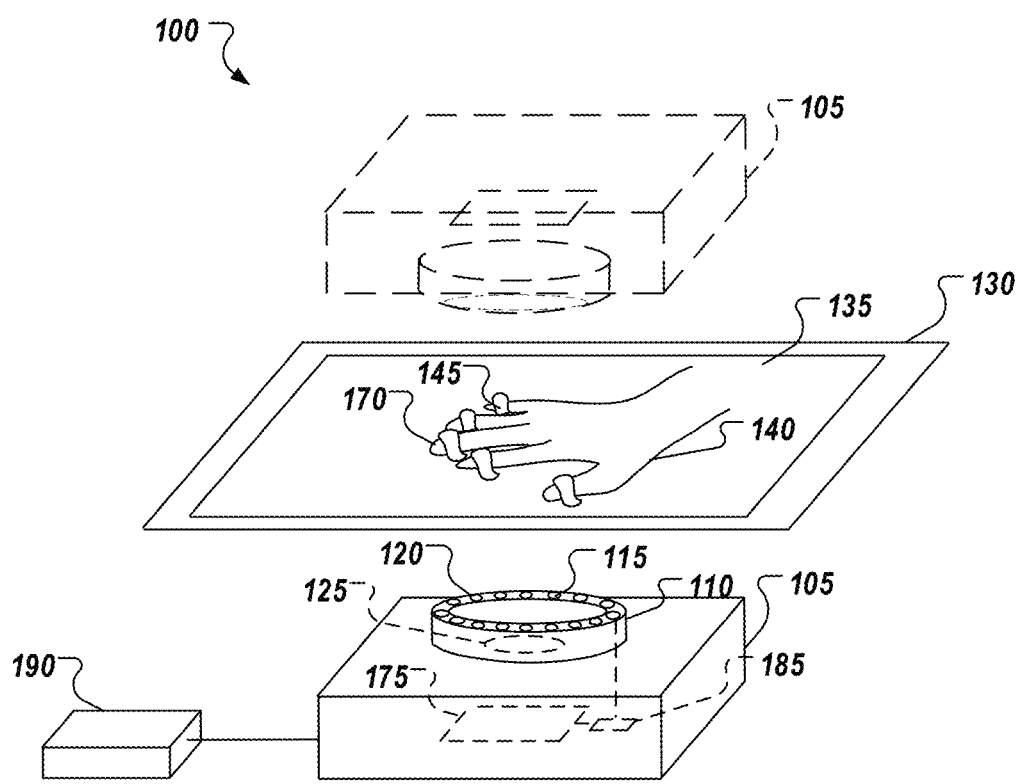
FIG. 1 is a perspective view of a hand scanner as an example environment in which the technology described herein may be used.

Repeat use of reference characters in the present specification and drawings is intended to represent same or analogous features or elements.

DETAILED DESCRIPTION

This document describes technology that generates a hand template to authenticate or verify a user. Various biometric identification/verification systems are based on gathering or capturing information from a user such as iris images, face images, fingerprint images, or hand images, which are then compared to template information previously stored during an enrollment process. For example, a biometric authentication system that uses hand identification may require enrolling users to place their hand in front or above/under an image-capturing device during an enrollment process. The images and/or templates captured during the enrollment process may be stored on a storage device accessible to the biometric authentication system. During run-time, a hand image of a user can be captured and a template generated from the image can be compared with previously-stored templates of the claimant or multiple potential users to find one or more matching templates, and to determine if the user may be authenticated. Malicious attempts to breach the security of such biometric authentication systems can include presenting an alternative representation of a hand of a claimant (e.g., an image of a hand of a person) to gain access to an account or other privileges associated with the identity of the corresponding live person. Such attacks are generally known as spoof attacks, and the reliability/security of a biometric authentication system can be determined by the ability of the system to differentiate between a live person and corresponding alternative representations. Such spoof-detection capabilities can be improved by using a multimodal biometric authentication system. Additionally, by using proprietary composite templates that are derived from multiple illumination wavelengths (e.g. not only visible but infrared and near ultraviolet illumination) and use higher resolutions, cross-matching issues such as matching with a publicly available image of the claimant's hands can be reduced. For example, an image acquisition device may capture two or more images of a hand illuminated under electromagnetic radiation of different wavelengths to generate two different templates of the same hand (e.g., using two different modalities of the same hand). The technology described in this document allows for combining or fusing images (or templates) of two separate modalities to create a unique composite template or fused template that is different from either of the original templates and images. During run time, an equivalent fused image or template for comparison with a template is generated by imaging a corresponding portion of the human body (e.g., a hand in the current example) under two separate modalities and combining them essentially in the same way in which the fused template or image is generated. Therefore, any spoof alternative representations presented during run time is likely to yield an image that is significantly different from the stored templates. Second, by using additional wavelengths and higher resolutions, new hand features can be seen and encoded into the fused or composite template and thus improve biometric resolution and identification power of the system. The security, reliability, and accuracy of biometric authentication systems can be therefore significantly improved using the technology described herein.

FIG. 1 shows a hand scanner 100 as an example environment in which the technology described herein may be used. Such hand scanners may be used for various purposes that require authenticating users via one or more biometric authentication processes. For example, the hand scanner 100 can be implemented in a kiosk (not shown) that is used for authenticating users. Such a kiosk can be an automated teller machine or a kiosk in a restaurant or in any other public place. The hand scanner 100 can be built into the kiosk or can be implemented as a separate device that communicates with the kiosk. For example, scanner 100 can be implemented in an automated teller machine (ATM) that allows a user to withdraw money from a bank account. In another example, the hand scanner 100 may be deployed at a restaurant or a fast-food outlet kiosk, and allow a user to order and pay for food. The hand scanner 100 may also be deployed at an entry point (e.g., at the gate of an arena or stadium) to authenticate entrants prior to entering the venue. In general, the hand scanner 100 may be deployed at various types of locations to authenticate users interactively.

In some implementations, the hand scanner 100 can include one or more components that support a biometric authentication system. For example, as described in more detail below, the hand scanner 100 can include one or more illumination sources 115 configured to radiate visible light in a short wavelength range. For example, illumination sources 115 can radiate a green light or a deep blue light (e.g., adjacent to ultraviolet light) in a short wavelength range of between 380 and 600 nanometers. The hand scanner 100 can also include infrared (IR) illumination sources 120 that generate electromagnetic radiation in the IR or near IR wavelength range. The hand scanner 100 can also include one or more cameras 105 that are configured to capture images of objects reflecting visible light in a short wavelength range and objects reflecting infrared light. For example, cameras 105 can be visible infrared (VIS/IR) cameras with enhanced violet sensitivity. Each camera 105 can capture images of the hands of the users interacting with the scanner 100. The captured images may be processed by one or more processing devices 190 communicatively connected to the camera 105. The images may be processed to identify, verify, or authenticate valid users, and/or permit or deny access to the services/products being offered through the kiosk on which the hand scanner 100 may be implemented. For example, the kiosk may include a display device (e.g., a capacitive touch screen) that allows a user to select and order food at a retail outlet. Once the user completes the selection via user-interfaces presented on the display device, the user may be asked to place his/her hand on (or hover above) a transparent surface 135 (e.g., a glass) of the hand scanner for authentication. The images captured using the camera 105 may then be used to authenticate/identify/verify a pre-stored profile for the user, and the payment for the food may then be automatically deducted from an account linked to the profile.

In some implementations, the images captured using the camera 105 can be processed by processing device 190 using an underlying biometric authentication system to identify/verify the user. In some implementations, the biometric authentication system may extract, from the images, various features-such as features derived from the palm, fingers, knuckles, and regions underlying the skin of the hand-to identify/authenticate a particular user based on matching the extracted features to that of one or more templates stored for the user during an enrollment process at various levels of resolution (including micro-features). The biometric authentication system may use a machine-learning process (e.g., a deep learning process implemented, for example, using a similarity metric such as Euclidean distance, Mahalanobis distance, cosine similarity; or a classifier such as support vector machine or a neural network) to match the user to one of the many templates (or to a group of templates) stored for various users of the system. In some implementations, the machine learning process may be implemented, at least in part, using one or more processing devices deployed on the hand scanner 100 or a kiosk communicatively connected to the hand scanner. In some implementations, said kiosk may communicate with one or more remote processing devices (e.g., one or more remote servers) that implement the machine learning process.

The images captured using cameras 105 are used to verify a user, and provide access to accounts/privileges associated with the identity of the user. However, malicious attempts to breach the security of such biometric authentication processes often involve presentation of a spoof alternative representation of a live person (e.g., photograph or other image or volumetric reconstruction of the hand of a live person printed on paper, or displayed on a high definition display device, or 3D printed) in an attempt to cause the underlying biometric authentication system to identify the alternative representation as the corresponding live person. Therefore, in many cases, the security and/or reliability of the underlying biometric authentication system depends on the ability of the system to discriminate between actual live persons and spoof alternative representations such as printed photographs or images displayed on display devices. The technology described herein allows for improving the discrimination capabilities of biometric authentication systems by using a multimodal biometric authentication system to create a unique template that combines information from multiple templates, thereby improving reliability/security of the systems.

Additionally, the multispectral and multi-resolution hand/finger scans and of the resulting hybrid templates can potentially mitigate concerns about cross matching issues with traditional biometric templates derived from hands and fingers. Given the rapid succession of multi-spectral image capture using a shared optical path in the proposed system, the NIR and near UV to green band images are co-registered and thus a composite image (early fusion) of the high resolution image of the hand may be used for user authentication. For example, images from two different wavelengths at higher resolution can be used to create two different templates that contain information about the hand of a user, and those templates can be combined to create a blended proprietary template at feature level. The information blended is non-reversible (e.g., cannot be separated into the two previous templates). A non-reversible template (composite or fused template) may include a nonlinear combination of local features followed by a matching operation between the features across those localities. These local descriptors can be histograms of local binary patterns around interest points derived from multispectral image and calculated at different resolutions, or patch descriptors resulting from application of auto-encoder neural networks to multispectral images around interest points, or overlapping or non-overlapping tiles over normalized hand images. Such a unique template can allow a biometric system to reduce errors during cross matching of the template with several (e.g., hundreds, thousands, or millions) stored templates of other users. Additionally, the multispectral, multiresolution templates of one or both sides of the hand that encompass skin and vascular features of interest along with hand geometry, can lead to higher entropy templates that increase the biometric resolving power of the system. Such hand biometric system can be used by itself or in conjunction with other biometric modalities, to a level that enables very large gallery identification. Large gallery identification is a process of matching a real-time template with a previously stored template that is stored among a large number of templates. In some implementations, the two images of different spectra (short and long wavelengths) can be used to generate two different templates that can be used to generate the composite template. In some other implementations, the two images of different spectra can be used, without first creating templates, to generate the composite template.

In some implementations, the hand scanner 100 includes a camera 105 with a field of view of the camera pointing toward a bottom surface of a glass 135 of a support surface 130. Camera 105 has a lens 125 and an image sensor 175 that can be communicably coupled to the light sources 115 and 120 through a synchronizing circuit 185. Circuit 185 synchronizes the light sources with image sensor 175 to illuminate the hand with illumination in a corresponding wavelength range when image sensor 175 captures an image of the hand. Camera 105 captures images of a portion of a human body such as a hand 140 positioned in front of the field of view of camera 105. Camera 105 can capture an image of the palm and fingers as hand 140 is extended on glass 135. Additionally, a second camera 105 facing the first camera can be placed on the opposite side of support surface 130 to capture images of the back of the hand 140. In some examples, additional cameras (not shown) can be arranged to capture images of a side of hand 140 or a different region of hand 140. In some implementations, guides 145 (e.g., finger guides or hand guides) can be attached to support surface 130 to reduce detrimental intra-subject scanning variabilities and/or to allow hand scanner 100 to have pre-determined camera focus settings. In some implementations, the hand scanner 100 can include a camera (or cameras) without a support surface 130, where the camera 105 can capture images of an extended hand hovered over the camera. While the description refers to "cameras," other types of image/data acquisition devices may also be used. In some implementations, 3D cameras/scanners (e.g. using structured light or time of flight sensors) are implemented alongside the indicated cameras to yield a volumetric image of the hand. Such 3D capture is used to generate assistive hand geometry features that can be used to (a) create additional biometric identification information and (b) used to normalize the 2D captured images by the main camera(s) should the hand be at an angle or otherwise not completely open or flat. Additionally, the relative positions of the cameras/sensors and other components of scanner 100 are illustrative, and other arrangements are within the scope of the disclosure.

Camera 105 includes illumination sources 115 configured to radiate visible light to illuminate the hand of the images being captured by camera 105. In some implementations, the wavelength ranges radiated by the illumination sources 115 can include the visible spectrum of about 380-600 nm, or sub-bands thereof. Additional illumination sources 120 are configured to generate electromagnetic radiation in the infrared (IR) or near-infrared (NIR) spectrum of about 700-1000 nm. The short wavelength illumination source is used to illuminate the hand to identify skin texture such as skin micro features. The short wavelength illumination enhances the contrast of skin features such as spots and freckles. The illumination source in the long wavelength range is used to capture subcutaneous (and deeper vasculature than subcutaneous) vasculature (e.g., veins, arteries, and emanating arcades) of the hand. While the example in FIG. 1 shows illumination sources 115 and 120 supported on a ring 110 of camera 105, the illumination sources can be positioned on a different location of camera 105 or external to the camera 105. In some implementations, the IR illumination source 120 can be position on the opposite side of camera 105 to radiate IR light that passes through the hand to reach the image sensor 175. For example, a bottom camera 105 facing the palm can capture images of the hand illuminated by an IR source positioned above the camera 105, illuminating the back of the hand 140. Illumination sources 115 and 120 can be synched with the camera (e.g., frame-synced), configured to quickly switch between short wavelength illumination (e.g., blue or blue-green light) and NIR illumination as the camera captures images of the hand. In some implementations, hand scanner 100 can be inside an enclosure that limits environmental light interference, improving the quality of the images and thus the accuracy of the biometric process.

Figure 2:
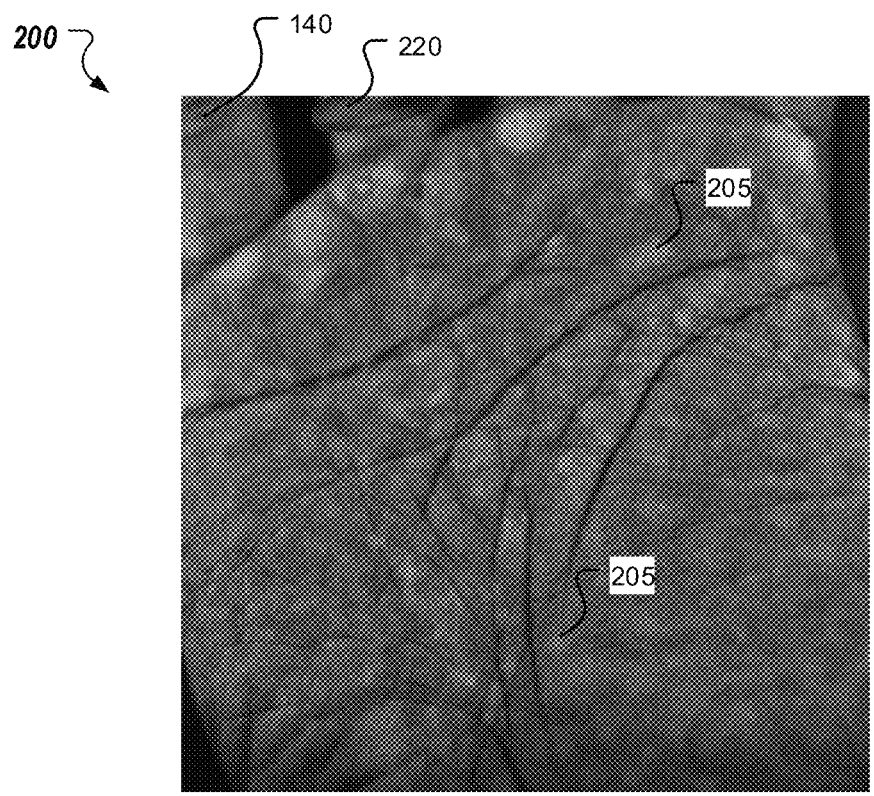
FIG. 2 shows an example of an image of a hand illuminated by a short wavelength illumination source.
Figure 3:
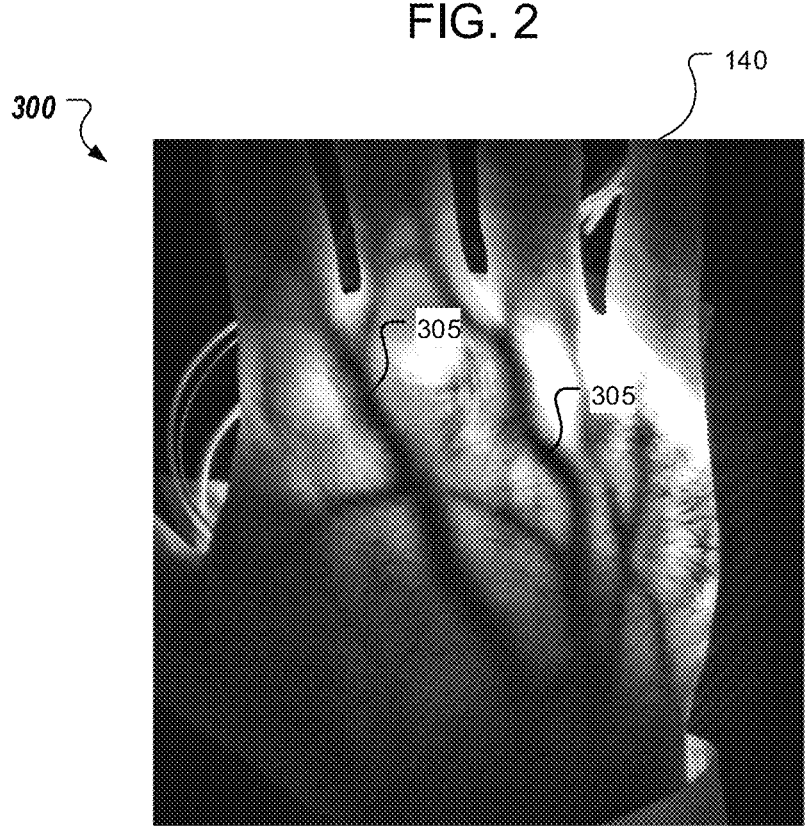
FIG. 3 shows an example of an image of a hand captured under infrared illumination.

FIGS. 2 and 3 show example images of a hand captured under short wavelength illumination and IR illumination respectively. The technology described herein can be used to improve the reliability of a biometric authentication system by using a multimodal biometric system based on images captured from the same hand. Referring to FIG. 2, the camera 105 (shown in FIG. 1) can capture, under short wavelength illumination, a first image 200 of the hand 140 showing skin features or artefacts 205 that are micro features or microforms, including fine-level structures such as freckles, spots, birthmarks, moles, and wrinkles. The short wavelength illumination enhances the skin texture by enhancing the contrast of the spots, freckles, moles, birthmarks, and wrinkles. The visible skin texture scanning can be done by the hand scanner cameras on one or both sides of the hand. Referring to FIG. 3, the same or a different camera can capture, under IR illumination, a second image 300 of the same hand 140 showing subcutaneous (and deeper) vasculature 305 such as veins, arteries, and other vascular arcades. The IR wavelength illumination penetrates the skin, revealing underlying (e.g., subdermal) vascular structure. The aforesaid illuminator can be positioned on the same or opposite side of the hand as the camera. The camera can capture multiple images of the hand to create a group of bi- or multi-spectral scans, including short (blue-green) and long (NIR) wavelengths. As further described in detail below, a template is generated from each of the first and second images 200 and 300 to generate a third unique template. In some implementations, each template is generated by first extracting or cropping a region of interest (ROI) from the hand image 200, and then processing the ROI to generate a series of local binary pattern codes of the image. In some implementations, extracting an ROI includes converting the image to grayscale and resizing the image. Such template is then combined with the template of the second image 300 to create a unique template that is used to authenticate the user. The ROIs can be limited to an area of the palm, the fingers, or knuckles. Referring to FIG. 2, the ROIs can be selected to exclude occlusions like rings 220, bracelets, bandages and so forth. In some implementations, the template can be generated using an entire area of the hand and wrist. In some implementations, the camera can capture double-sided images (e.g., palm and back of the hand) of the hand illuminated under each wavelength region.

Figure 4:
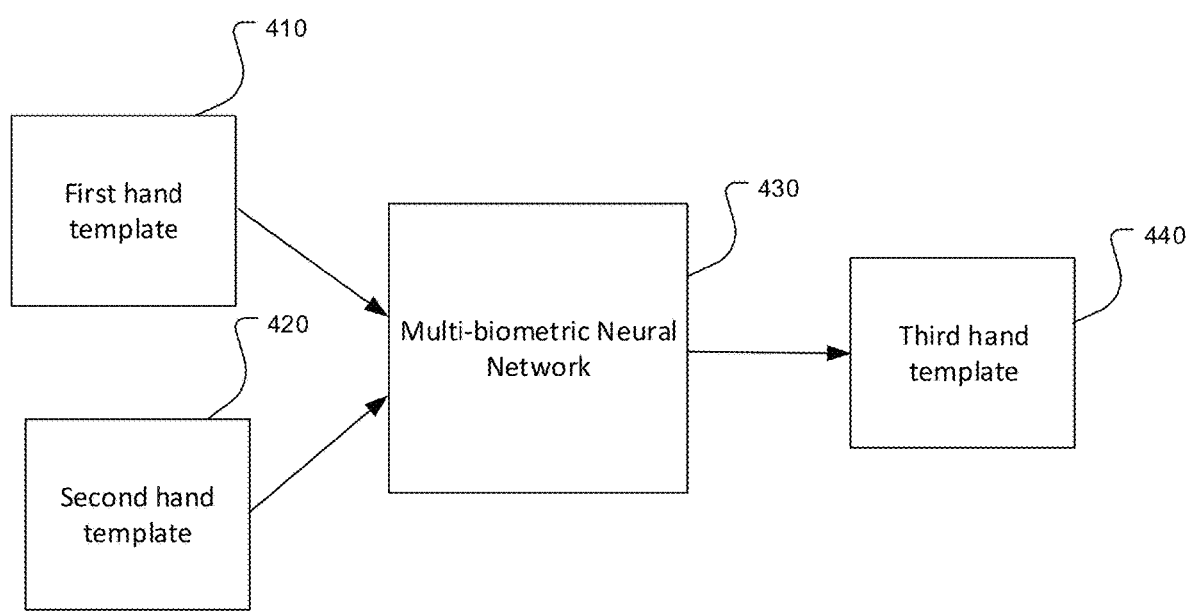
FIG. 4 is a schematic diagram that illustrates creation of a third template.

Such double-sided image of a hand can be captured under a short wavelength illumination source or under IR illumination. The image capturing the back of the hand 140 can show the knuckles in enhanced contrast to allow them to be identified during the template-generation process. In some implementations, the IR image is captured by illuminating the hand on the same side as the camera. In some implementations, the camera and IR light source are on the opposing sides of the hand After images under the different wavelengths have been captured, a third template such as a mathematical representation is generated using the technology described herein. The third template (e.g., the composite template) can be a product of a fusion process performed in the multi-biometric system described herein. As further described in detail below, instead of being the product a linear combination of the two original images or templates, the third template is a unique, generally non-reversible template generated via a non-linear fusion of information from the first image (or template) and the second image (or template). The third template can include information that represents internal vasculature and skin micro features or microforms. FIG. 4 is a schematic diagram that illustrates creation of a biometric hand template 440. In some implementations, to combine the two hand templates and generate a unique third template, a machine-learning process such as one using a convolutional neural network (CNN) can be used. More particularly, a CNN can be used to process multiple biometric images of a single hand to generate a unique template of the hand. For example, an input layer of the process can be provided with two hand templates 410 and 420 generated from the same hand (see FIGS. 2 and 3). In some implementations, instead of filtering the templates before being fed to the CNN, the templates can be filtered (or further filtered) in the CNN. The first template 410 has information associated with skin features of the hand in short-wavelength visible light, and the second template 420 has information associated with subcutaneous vasculature of the hand from NIR. The two templates 410 and 420 are fed to the multi-biometric CNN to be 'fused' into one distinct template. For example, a middle layer of the process includes a multi-biometric neural network 430 or a feature fusion module that performs a fusion function. As further discussed in detail below, the fusion function can include early, intermediate, or late fusion. An output layer of the process provides as an output, the third template 440 that is a product of the fusion performed in the multi-biometric CNN. Instead of being the product of one image placed on top of another (e.g., a linear combination of the two original images or templates), the third template 440 is a unique, generally non-reversible template generated via a non-linear fusion of information from the first template 410 and the second template 420.

In some implementations, the fusion of information can be performed using a deep multi-biometric CNN or by traditional methods such as Principal Component Analysis or support vector machine (SVM) based fusion. An advantage of the deep multi-biometric CNN is that the image templates 410 and 420 can be matched through intermediate or late fusion. For example, early fusion is performed at an image level, intermediate fusion is performed at a feature level, and late fusion is performed at a 'score' or decision level. In early fusion, various pre-trained networks such as the Visual Geometry Group (VGG) and InceptionNet can be used for fusion of information from multiple biometric sources (e.g., multiple modalities). In intermediate fusion, the CNN accepts inputs from two different biometric sources. Each input goes through different layers of the CNN. At some point, layers associated with different inputs are merged together. This merged (concatenated) layer is accompanied by another fully connected and a soft-max layer for classification. In late fusion, the posterior probabilities obtained from soft-max layers, that is the probability of test sample belonging to each class, are combined (e.g., using product or sum rule) for different CNN networks trained on different sources of information. In some implementations, the fused features prior to the last classification layer in a deep network are taken as the fused template and used for biometric template matching by applying a similarity metric such as cosine or Euclidian similarity metric. In some implementations, these scores are obtained by different classifiers such as Support Vector Machines or Bayesian classifiers. In some implementations, the outputs of fully connected layers preceding the classification layer in CNNs that were separately trained to classify users using two different hand spectra (such as short and long wavelength captures) are concatenated and fed to an additional fully connected layer and further trained with a new classification head to produce intermediate fusion. In some implementations, the third template can also be generated based on predefined portions of the image, which can be either automatically identified, or selected based on some manual input. For example, the third template can be generated using traditional interest point finders and local feature generators such as local binary patterns (LBP), speed up robust features (SURF), or histogram of oriented gradient (HOG).

To validate a user, template(s) generated from the presented hand are compared to one or more previously stored templates (enrollments). For example, a hand template can be generated by the process describe above and then stored in a storage device in accordance with a database management system (enrollment template). The enrollment template is usable to verify an access attempt by a corresponding user, or identify the user by matching the presented template against the gallery of templates from all other users. To authenticate a user, a processor may first determine that one or more metrics representing a similarity between the presented and enrolled template(s) satisfy a threshold condition. After the threshold condition is satisfied and upon determining that the one or more metrics representing the similarity between the presented template and the enrolled template satisfy a threshold condition, the processor can provide access to the secure system. Appropriate metrics that represent a similarity between the third image and a stored template include cosine similarity, Euclidean distance, Mahalanobis distance, or a learned data-driven similarity metric.

Figure 5:
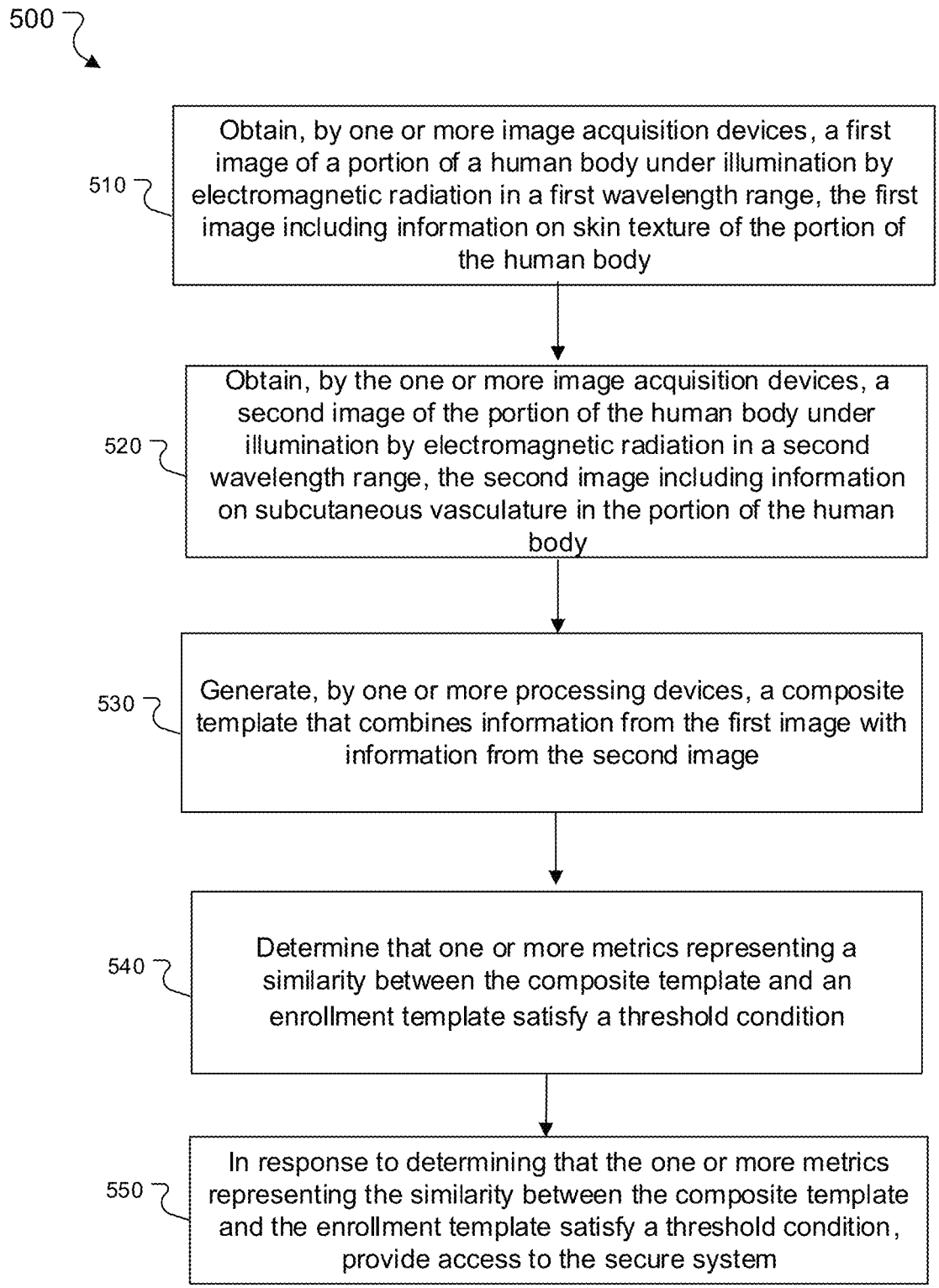
FIG. 5 is a flowchart of an example process of controlling access to a secure system.

FIG. 5 is a flowchart of an example process for controlling access to a secure system. In some implementations, at least a portion of the process 500 may be executed by one or more processing devices disposed within a hand scanner such as the hand scanner 100 described with reference to FIG. 1. In some implementations, the one or more processing devices can be disposed within a kiosk such as the kiosk described with reference to FIG. 1. In some implementations, at least a portion of the process 500 may be executed by an image analysis engine (not shown), which may be disposed within a hand scanner, a kiosk, or at one or more servers (such as servers or computing devices in a distributed computing system) in communication with remote components such as one or more processing devices disposed within a kiosk.

Operations of the process 500 includes obtaining, by one or more image acquisition devices, a first image of a portion of a human body under illumination by electromagnetic radiation in a first wavelength range, the first image including information on skin texture of the portion of the human body (510). Operations of the process 500 further includes obtaining, by the one or more image acquisition devices, a second image of the portion of the human body under illumination by electromagnetic radiation in a second wavelength range, the second image including information on subcutaneous vasculature in the portion of the human body (520). In some implementations, generating the template for the first and second images may include extracting, from the first and second images, a respective portion representative of the hand. In some implementations, extracting a portion representative of the hand comprises excluding at least partially accessories worn on the hand.

Operations of the process 500 also includes generating, by one or more processing devices, a third image that combines information from the first image with information from the second image (530). In some implementations, generating the third image may include fusing, using a multimodal convolutional neural network (CNN), the information from the first image or template with the information from the second image or template. In some implementations, the fusion of information can be performed at one of and early fusion level, intermediate fusion level, or late fusion level. In come implementations, fusing the information from the first image with the information from the second image includes generating a first template of the first image, generating a second template of the second image, and feeding the first and second templates to the multimodal CNN to generate the third template.

Operations of the process 500 also includes determining that one or more metrics representing a similarity between the third image and a template image satisfy a threshold condition (540), and responsive to determining that the one or more metrics representing the similarity between the third image and the template satisfy a threshold condition, providing access to the secure system (550).

Figure 6:
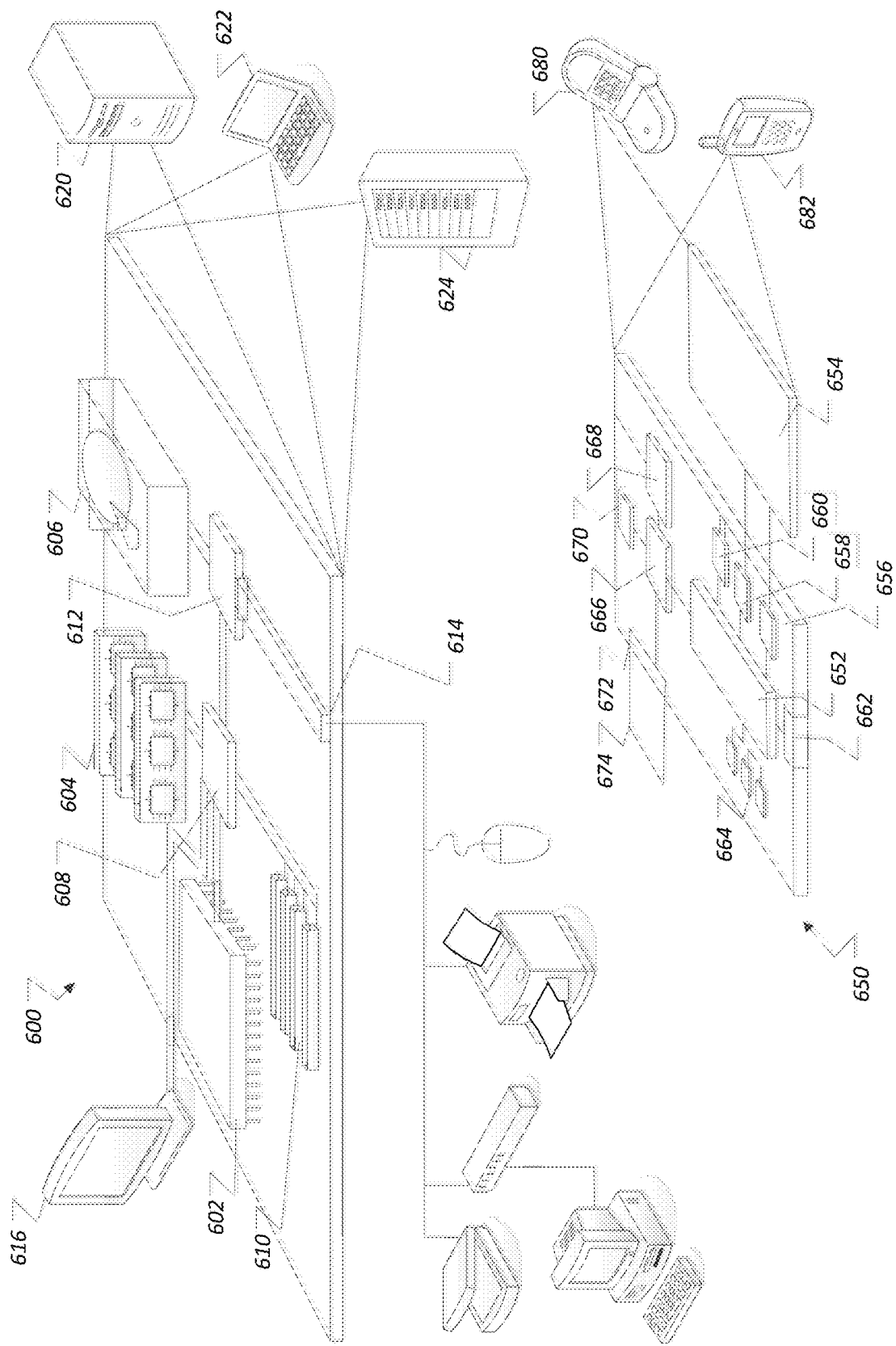
FIG. 6 is a block diagram representing examples of computing devices.

FIG. 6 shows an example of a computing device 600 and a mobile device 650, which may be used with the techniques described here. For example, referring to FIG. 1, the kiosk device 100 can include one or more of the computing device 600 or the mobile device 650, either in part or in its entirety. Computing device 5400 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. The components shown here, their connections and relationships, and their functions, are meant to be examples only, and are not meant to limit implementations of the techniques described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, memory on processor 602, or a propagated signal.

The high speed controller 608 manages bandwidth-intensive operations for the computing device 600, while the low speed controller 612 manages lower bandwidth-intensive operations. Such allocation of functions is an example only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, memory on processor 652, or a propagated signal that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, and so forth) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, tablet computer, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well. For example, feedback provided to the user can be any form of sensory feedback (e.g., visual feedback, auditory feedback, or tactile feedback). Input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications may be made without departing from the scope of the inventive concepts described herein, and, accordingly, other implementations are within the scope of the following claims.

What is claimed is:

1. A method of controlling access to a secure system, the method comprising:
   obtaining, by one or more image acquisition devices, a first image of a portion of a human body under illumination by electromagnetic radiation in a first wavelength range, the first image including information on skin texture of the portion of the human body;
   obtaining, by the one or more image acquisition devices, a second image of the portion of the human body under illumination by electromagnetic radiation in a second wavelength range, the second image including information on subcutaneous or deeper vasculature in the portion of the human body;
   generating, by one or more processing devices using a machine-learning based process with a deep multi-biometric convolutional neural network (CNN), a composite template by non-linear fusion of (i) information from the first image with (ii) information from the second image, wherein generating the composite template comprises accepting the information from the first image and the information from the second image as inputs of the deep multi-biometric CNN, processing each of the inputs through different layers of the deep multi-biometric CNN by processing first inputs associated with the information from the first image using at least one first layer of the deep multi-biometric CNN and processing second inputs associated with the information from the second image using at least one second layer of the deep multi-biometric CNN, and merging layers associated with the inputs in the deep multi-biometric CNN by merging the at least one first layer and the at least one second layer to obtain fused features as the composite template, wherein the at least one first layer and the at least one second layer are different from each other and separately trained using two different spectra of the portion of the human body that correspond to the first wavelength range and the second wavelength range;
   determining that one or more metrics representing a similarity between the composite template and an enrollment template satisfy a threshold condition; and
   responsive to determining that the one or more metrics representing the similarity between the composite template and the enrollment template satisfy a threshold condition, providing access to the secure system.

2. The method of claim 1, wherein generating the composite template comprises using a classifier configured to fuse the information from the first image and the information from the second image at one of an early fusion level, an intermediate fusion level, or a late fusion level.

3. The method of claim 2, wherein generating the composite template comprises first generating a first template from the first image and generating a second template from the second image.

4. The method of claim 3, wherein generating the templates for the first and second images comprises extracting, from the first and second images, a respective portion representative of a hand.

5. The method of claim 4, wherein extracting a portion representative of the hand comprises excluding at least partially accessories worn on the hand.

6. The method of claim 1, wherein the skin texture comprises micro features.

7. The method of claim 1, wherein the skin texture comprises at least one of: freckles, spots, moles, lines, or wrinkles.

8. The method of claim 1, wherein the portion of the human body comprises a hand.

9. The method of claim 8, wherein obtaining the first image and the second image of the hand comprises capturing double-sided images of the hand.

10. The method of claim 1, wherein the first wavelength range comprises a wavelength range between 380 and 600 nanometers.

11. The method of claim 1, wherein the second wavelength range comprises a wavelength range between 700 and 1000 nanometers.

12. The method of claim 1, wherein the one or more metrics comprise one or more of a cosine similarity metric, a Euclidean distance metric, a Mahalanobis distance metric, or a learned data-driven similarity metric.

13. The method of claim 1, wherein generating the composite template comprises obtaining a fully connected and soft-max layer for classification with a merged layer.

14. The method of claim 1, wherein the composite template is a non-reversible template that comprises a nonlinear combination of local features of the information from the first image and the information from the second image followed by a matching operation between the local features across corresponding localities.

15. A system comprising:
at least one processing device associated with a secure system; and
a memory communicatively coupled to the at least one processing device, the memory storing instructions which, when executed, cause the at least one processing device to perform operations comprising:
obtaining, from one or more image acquisition devices, a first image of a portion of a human body under illumination by electromagnetic radiation in a first wavelength range, the first image including information on skin texture of the portion of the human body;
obtaining, from the one or more image acquisition devices, a second image of the portion of the human body under illumination by electromagnetic radiation in a second wavelength range, the second image including information on subcutaneous vasculature in the portion of the human body;
generating, using a machine-learning based process with a deep multi-biometric convolutional neural network (CNN), a composite template by non-linear fusion of (i) information from the first image with (ii) information from the second image, wherein generating the composite template comprises accepting the information from the first image and the information from the second image as inputs of the deep multi-biometric CNN, processing each of the inputs through different layers of the deep multi-biometric CNN by processing first inputs associated with the information from the first image using at least one first layer of the deep multi-biometric CNN and processing second inputs associated with the information from the second image using at least one second layer of the deep multi-biometric CNN, and merging layers associated with the inputs in the deep multi-biometric CNN by merging the at least one first layer and the at least one second layer to obtain fused features as the composite template, wherein the at least one first layer and the at least one second layer are different from each other and separately trained using two different spectra of the portion of the human body that correspond to the first wavelength range and the second wavelength range;
determining that one or more metrics representing a similarity between the composite template and an enrollment template satisfy a threshold condition; and
responsive to determining that the one or more metrics representing the similarity between the composite template and the enrollment template satisfy a threshold condition, providing access to the secure system.

16. The system of claim 15, further comprising:
an image acquisition device;
a first illumination source configured to radiate light in the first wavelength range; and
a second illumination source configured to radiate light in the second wavelength range.

17. The system of claim 16, wherein the image acquisition device comprises a field of view facing the second illumination source such that the portion of the human body is between the image acquisition device and the second illumination source.

18. The system of claim 15, wherein generating the composite template comprises using a classifier configured to fuse the information from the first image and the information from the second image at one of an early fusion level, an intermediate fusion level, or a late fusion level.

19. The system of claim 18, wherein generating the composite template comprises first generating a first template from the first image and generating a second template from the second image.

20. The system of claim 19, wherein generating the template for the first and second images comprises extracting, from the first and second images, a respective portion representative of a hand.

21. The system of claim 15, wherein the one or more metrics comprise one or more of a cosine similarity metric, a Euclidean distance metric, a Mahalanobis distance metric, or a learned data-driven similarity metric.

22. The system of claim 15, wherein the skin texture comprises micro features.

* * * * *